(12) United States Patent
Nakagawa et al.

(10) Patent No.: US 6,464,159 B2
(45) Date of Patent: Oct. 15, 2002

(54) COATED FISHING COMPONENTS

(75) Inventors: Shouji Nakagawa, Sakai (JP); Taisei Morise, Sakai (JP); Jun Sato, Sakai (JP); Ken'ichi Sugawara, Sakai (JP)

(73) Assignee: Shimano Inc., Osaka (JP)

( * ) Notice: Subject to any disclaimer, the term of this patent is extended or adjusted under 35 U.S.C. 154(b) by 40 days.

(21) Appl. No.: 09/842,950

(22) Filed: Apr. 27, 2001

(65) Prior Publication Data

US 2001/0042805 A1 Nov. 22, 2001

(30) Foreign Application Priority Data

May 17, 2000 (JP) ......................................... 2000-144404
Sep. 7, 2000 (JP) ......................................... 2000-271606

(51) Int. Cl.7 ..................... A01K 89/015; B32B 15/18; F16B 39/02
(52) U.S. Cl. ........................ 242/310; 411/903; 411/301; 428/472.1; 428/472.2
(58) Field of Search .................... 242/310–13; 411/291, 411/903, 301–302; 428/471.1, 471.2; 205/199, 201, 171–172, 317; 204/486, 471

(56) References Cited

U.S. PATENT DOCUMENTS

| 2,885,108 | A | | 5/1959 | Donoghue | |
|---|---|---|---|---|---|
| 4,268,324 | A | * | 5/1981 | Sharma | 126/908 |
| 4,905,930 | A | * | 3/1990 | Puryear et al. | 242/312 |
| 5,156,720 | A | * | 10/1992 | Rosenfeld et al. | 156/233 |
| 5,540,529 | A | * | 7/1996 | Jansson et al. | 403/370 |
| 5,662,443 | A | * | 9/1997 | Dziaba | 411/280 |
| 5,915,902 | A | * | 6/1999 | Patterson et al. | 411/277 |
| 6,293,484 | B1 | * | 9/2001 | Oh | 242/310 |

FOREIGN PATENT DOCUMENTS

| EP | 57121977 | 7/1982 |
|---|---|---|
| EP | 0 594 955 A2 | 5/1994 |

* cited by examiner

Primary Examiner—Christopher P. Ellis
Assistant Examiner—Sang Kim
(74) Attorney, Agent, or Firm—Shinjyu Global IP Counselors, LLP (57) ABSTRACT

Paint-coated fishing component formed with recesses in which build-up of paint in the recesses is unlikely. A reel body (1) made of a magnesium alloy painted by electrodeposition includes a first side cover (6a) and a second side cover mounted to the sides of a frame. The first side cover (6a) is fastened by attaching screws (30) from the inner side of a first side plate (7a) to a plurality of protrusion portions (20) formed protruding on a rear surface. The protrusion portions (20) are provided with conduits (25) communicating recess portions formed with female threads to the immediate exterior. The conduits (25) are slits that are formed in the protrusion direction of the protrusions (20) or perpendicular to the protrusion direction, and are cut with a T-slot cutter, for example.

17 Claims, 13 Drawing Sheets

COATED FISHING COMPONENTS

BACKGROUND OF THE INVENTION

1. Technical Field

The present invention relates to coated components, and more particularly, to paint-coated fishing components utilized in fishing reels.

2. Description of Related Art

The main types of fishing reels that are mounted on a fishing rod and used for reeling out and winding in fishing line are spinning reels, dual-bearing reels, and single-bearing reels. These types of fishing reels are provided with a reel body that attaches to a fishing rod, and a spool attached to the reel body for winding fishing line. The main parts of the reel bodys in dual-bearing reels, for example, are a frame, and side covers fastened with screws to both sides of the frame. In these side covers, protrusions, such as bosses for holding screws, are formed protruding on the reverse side of the side covers, in order to prevent the screw terminals from being exposed on the surface of the side covers. The protrusions have recesses, such as threaded sockets, whose tip ends are open, forming a so-called cap-screw configuration (in which the sockets are not bores completely penetrating the protrusions to otherwise open their base ends onto the obverse side of the side covers).

The main components of such a fishing reel (such as de covers) are made of an aluminum alloy or a magnesium alloy, for example, in order to make the fishing reel lighter. Especially when the main components are made of a magnesium alloy, their surface is coated with paint to increase their corrosion resistance. Coating with paint is carried out by spray coating or electrodeposition, for example. To coat the main components by electrodeposition, an anodic oxide film layer is usually formed on the main components, and then the main components are immersed in a paint bath to adhere the paint.

To coat the main components, such as the above-mentioned side covers, of a fishing reel by electrodeposition, the entire side cover is immersed in the paint bath, so that the paint adheres not only to the obverse side of the side cover, but also to the reverse side where the protrusion portions are formed. Herein, in particular with the protrusions of a cap screw construction, there is the risk that paint invading the protrusion openings builds up in the threaded sockets. Paint building up in the threaded sockets brings about the need to reprocess the screw hole, as it may become impossible to insert the screw all the way to the end.

SUMMARY OF THE INVENTION

An object of the present invention is, for coated fishing components formed with recesses, to make build-up of coating paint in the recesses unlikely.

According to a first aspect of the present invention, a painted fishing gear component used for a fishing reel, includes a main component and a paint film layer formed by soaking the main component with paint. The main component includes a main part, a recess portion provided with an opening formed on the main part, and a conduit formed on the main part, communicating the recess portion with its exterior.

In this painted fishing gear component, the main component is coated by immersion in paint after the main part has been provided with a recess portion and a conduit. The main part is provided with a conduit communicating the recess portion with its exterior. Consequently, excess paint is discharged through the conduit to the outside, so that paint is unlikely to build up in the recess portion.

According to a second aspect of the present invention, in a painted fishing gear component as in the first aspect, the main part is provided with a protrusion portion provided with said conduit and said recess portion with said opening at the protrusion portion's end. In this case, the main part is provided with a protrusion portion having a recess portion for attaching a screw or positioning, for example. The protrusion portion is provided with the conduit for lo communicating the recess portion with the exterior thereof, so that as in the first aspect of the present invention, paint is unlikely to build up in the recess portion.

According to a third aspect of the present invention, in a painted fishing gear component as in the first or second aspect, the paint film layer is an electrodeposition layer formed by electrodeposition. This improves the deposition of paint on the main component.

According to a fourth aspect of the present invention, a painted fishing gear component as in the third aspect further includes an anodic oxide film layer between the main component and the electrodeposition layer. This improves the corrosion resistance of the main part, as well as the deposition of the electrodeposition layer.

According to a fifth aspect of the present invention, in a painted fishing gear component as in any of the second to fourth aspect, the conduit is a slit formed in the protrusion portion. Such a slit can be arranged in the protrusion direction of the protrusion portion (that is, vertically) or perpendicular to the protrusion direction (that is, horizontally).

According to a sixth aspect of the present invention, in a painted fishing gear component as in any of the second to fifth aspect, the conduit is formed on a base side of the protrusion portion. In this case, the paint can be discharged easily, because the conduit is formed near the bottom of the recess portion.

According to a seventh aspect of the present invention, in a painted fishing gear component as in any of the second to fifth aspect, the conduit is formed extending from the opening to a base side of the protrusion portion. In that case, it is easy to form the conduit, for example by forming a vertical slot extending from the opening.

According to an eighth aspect of the present invention, in a painted fishing gear component as in any of the first to seventh aspect, the conduit is formed by cutting. In that case, it is easy to form the conduit, for example with a cutting tool, such as a T-slot cutter.

According to a ninth aspect of the present invention, in a painted fishing gear component as in any of the first to eighth aspect, the main component is made of an alloy selected from the group consisting of magnesium alloy, aluminum alloy and titanium alloy. Using a light metal, such as magnesium alloy, aluminum alloy and titanium alloy, it is possible to make a light-weight main component.

According to a tenth aspect of the present invention, in a painted fishing gear component as in any of the first to ninth aspect, the main component is a side cover attached to a frame of a fishing reel. In that case, paint is unlikely to build up in the recess portions of the protrusion portions for attaching a screw or for positioning, formed protruding from a protrusion portion side (rear side) of the side cover. Furthermore, because the conduit is formed in the protrusion portion, the protrusion portion side is not communicated with the exterior on the opposite side (obverse side) by otherwise penetrating the main part through the recess portion in the protrusion portion. Thus, water is prevented from entering from the obverse side to the reverse side through the conduit in the side cover when the side cover is attached to the frame.

According to an eleventh aspect of the present invention, in a painted fishing gear component as in the tenth aspect, the side cover is screwed to the frame, the protrusion portion is a boss portion for attaching a screw, and the recess portion is provided with a female thread into which said screw is screwed. In that case, the recess portion is a screw hole into which the screw for fastening the cover is screwed, and the conduit averts build-up of paint in the screw hole, so that reprocessing the screw hole becomes unnecessary.

According to a twelfth aspect of the present invention, a painted fishing gear component as in any of the first to eleventh aspect further includes a reinforcement member mounted on the protrusion portion. In that case, it is possible to keep up the strength of the protrusion portion, even when the protrusion portion has been provided with a vertical slot extending from the opening serving as the conduit.

According to a thirteenth aspect of the present invention, a painted fishing gear component as in any of the first to twelfth aspect further includes a cover member that is a shutoff between the conduit its exterior. The cover member is furnished to function for example as the reinforcement member of the eleventh aspect of the present invention. That is, insofar as attaching another component to the main part is concerned, the cover member fulfills an equivalent role to that of the reinforcement member that attaches another member to the protrusion portion on the main part. The cover member is made of a metal, such as an aluminum alloy or a magnesium alloy, or of a synthetic resin, and can be fastened with screws to the main component at several locations. Thus, by attaching the cover member to the main component after the main component has been painted, the conduit is blocked from the outside. Consequently, paint is unlikely to build up in the recess portion, and in particular in recess portions for accepting screws or the like, it can be prevented that water enters the gap between recess portion and screw. Furthermore, if the conduit is closed together with the opening of the recess portion, the waterproofing effect is increased even further. Also, arranging the cover member such that it is not exposed to the surface side makes it possible to improve the looks of the fishing gear component.

According to a fourteenth aspect of the present invention, in a painted fishing gear component as in any of the first to thirteenth aspect, the conduit opens to the same side as the opening. In that case, the opening of the conduit is arranged on the same side as the opening of the recess portion, so that the recess portion and the conduit can be machined easily. If additionally a cover member is provided, then these apertures can be shut easily, because it is sufficient to provide the cover member only on the side of the apertures.

According to a fifteenth aspect of the present invention, in a painted fishing gear component as in any of the first to fourteenth aspect, the conduit is formed such that the recess portion does not completely penetrate the main part. In that case, the recess portion and the conduit do not form through-holes. Therefore, if the main component is exposed to the surface side, the looks of the fishing gear component can be improved, and the waterproofing effect can be increased, because no water enters through the apertures on the other end of such through-holes.

According to a sixteenth aspect of the present invention, in a painted fishing gear component as in any of the first to fifteenth aspect, the main component is a reel body of a fishing reel. In that case, paint is unlikely to build up in the recess portions for attaching a screw or for positioning, formed in the reel body (main component).

According to a seventeenth aspect of the present invention, in a painted fishing gear component as in the sixteenth aspect, the reel body is provided with a boss portion to which another component can be screwed. In that case, paint is unlikely to build up in the boss portions which are protrusions portions to which another component, such as a lid member or a cover member, can be screwed to the reel body.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

First Embodiment

Figure 1:
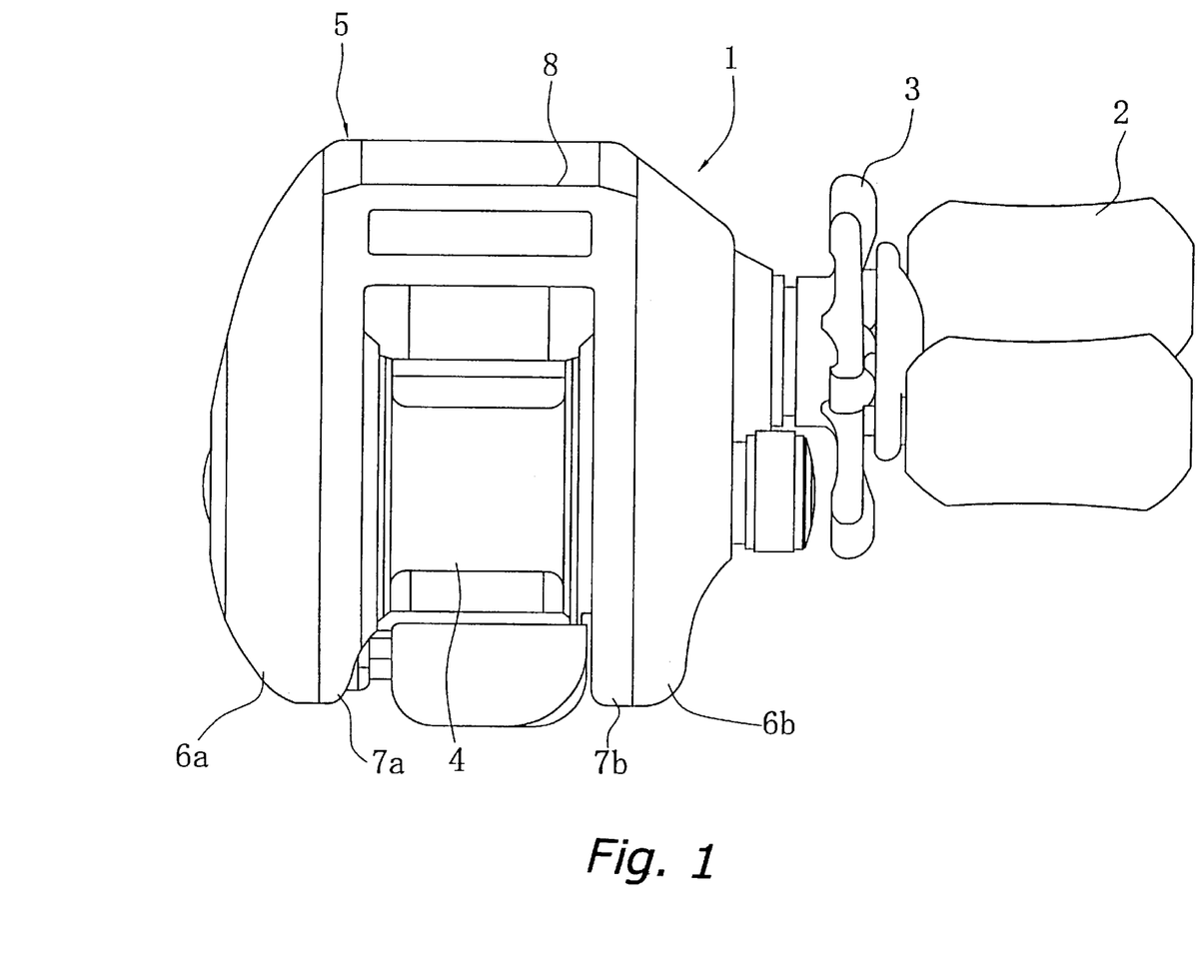
FIG. 1 is a plan view of a dual-bearing reel in which a first embodiment of the present invention is adapted.

As shown in FIG. 1, the dual-bearing reel in accordance with the first embodiment of the present invention is a low profile reel for bait-casting. This dual-bearing reel includes a reel body 1, a handle assembly 2 for turning a spool, and a spool 4 for winding fishing line. The handle assembly 2 is disposed on one side of the reel body 1. The spool 4 is provided rotatably and detachably inside the reel body 1. A star drag 3 for adjusting drag is disposed on the same side of the reel body 1 as the handle 2.

The reel body 1 includes a frame 5, and a first side cover 6a and a second side cover 6b attached to the two sides of the frame 5. The frame 5 includes a first side plate 7a and a second side plate 7b to which the first side cover 6a and the second side cover 6b are attached, and a plurality of connecting portions 8 connecting the first side plate 7a with the second side plate 7b into one unit.

Figure 2:
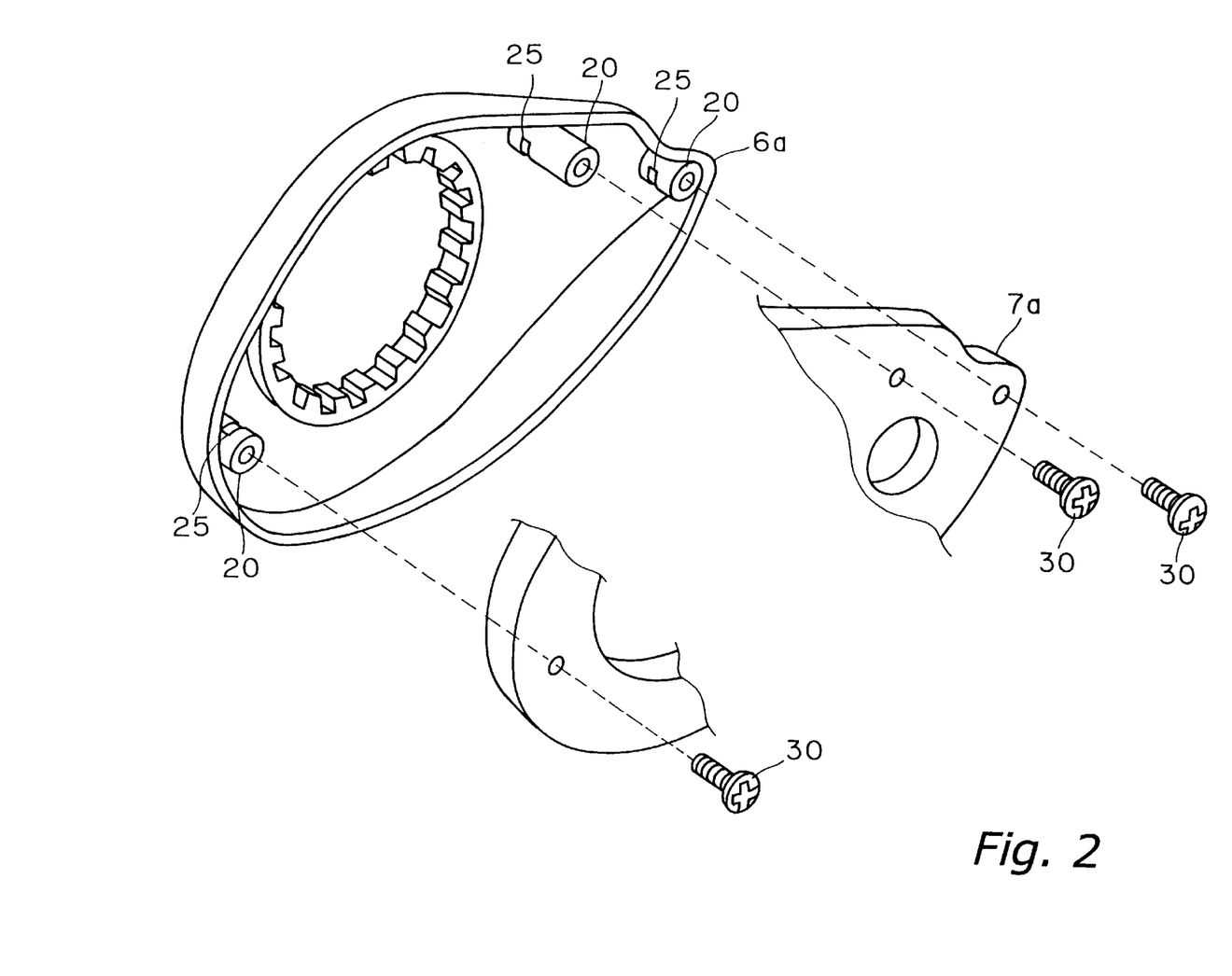
FIG. 2 is an exploded oblique, partly fragmentary view of a first side cover mounting environment.
Figure 3:
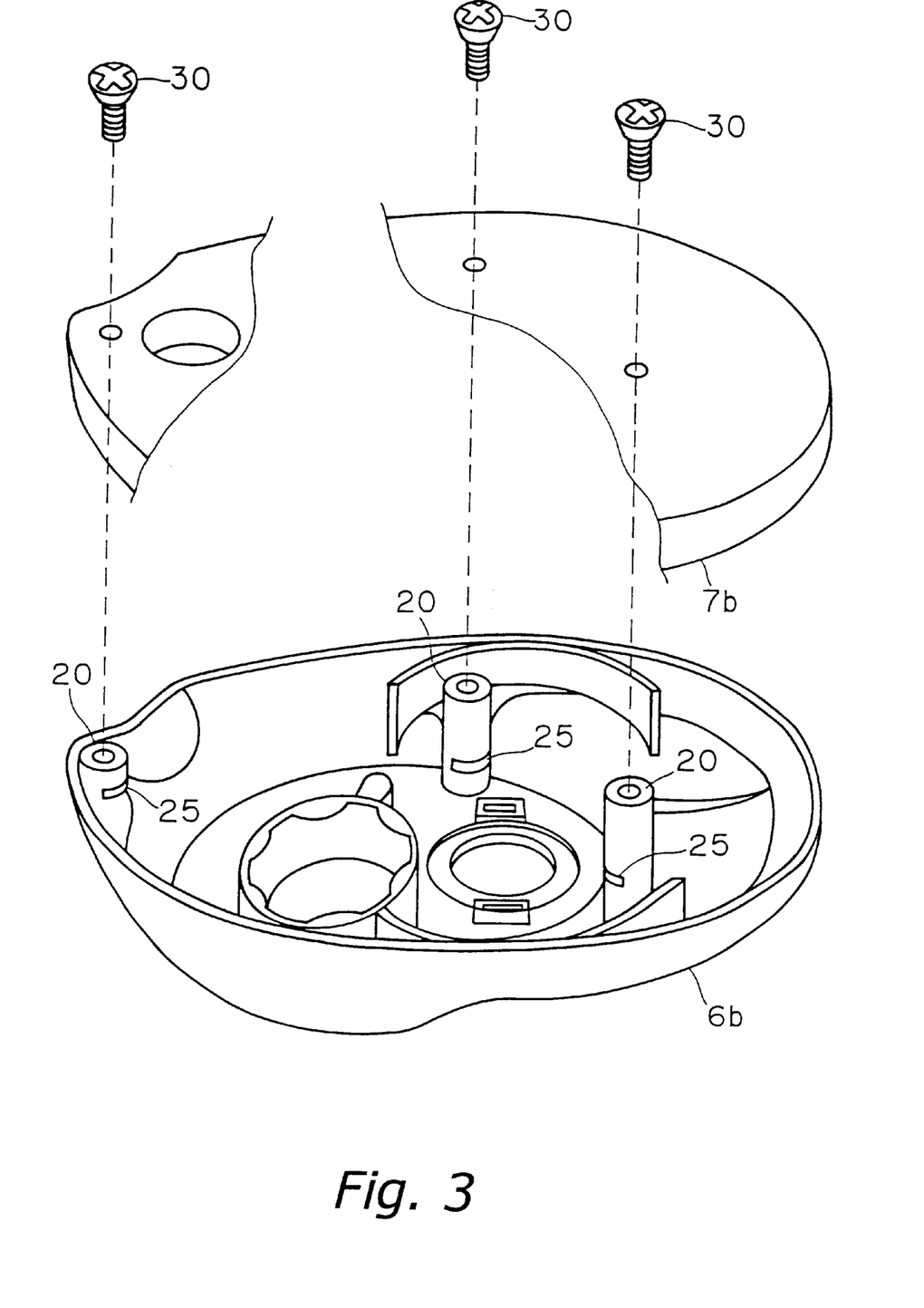
FIG. 3 is an exploded oblique, partly fragmentary view of a second side cover mounting environment.

As shown in FIGS. 2 and 3, the first side cover 6a and the second side cover 6b are fastened with screws 30 from the inside of the first side plate 7a and the second side plate 7b to a plurality of protrusion portions 20 protruding on the rear side of the first side cover 6a and the second side cover 6b. Therefore, the screw terminals are not exposed to the surface side of the first side cover 6a and the second side cover 6b.

Figure 4:
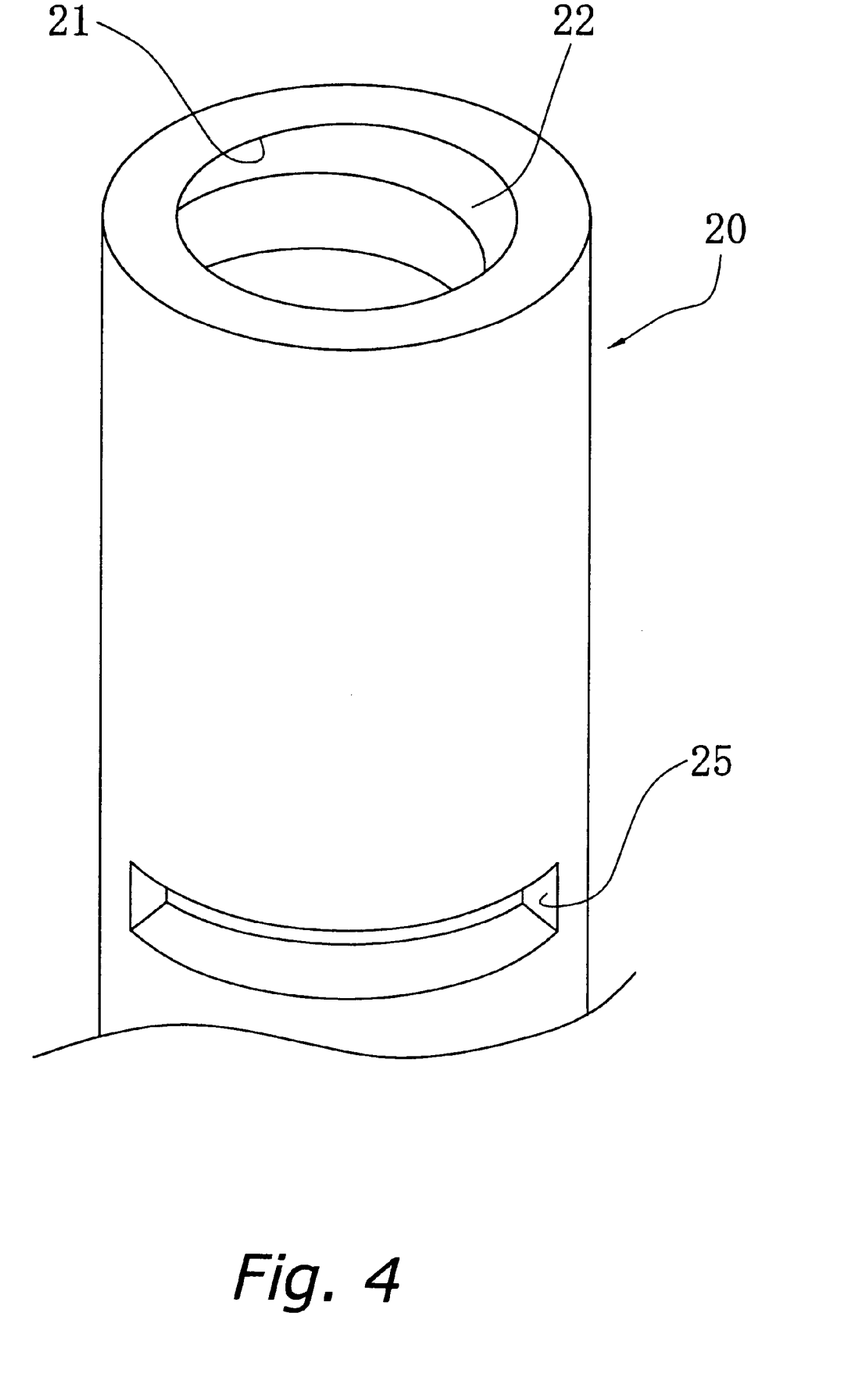
FIG. 4 is a fragmentary enlarged oblique view of a protrusion portion.

As shown enlarged in FIG. 4, the protrusion portion 20 includes a recess portion 22 in which female threads are formed and having an opening 21 at its tip end, and a conduit 25 formed base-endward communicating the recess portion 22 with its exterior. The conduit 25 is a slit arranged in a direction perpendicular to the direction in which the protrusion portion 20 protrudes (that is, horizontally), and is machined, for example with a with a T-slot cutter, so as to be communicated with the recess portion 22.

The members constituting the reel body 1 (in the following collectively referred to as main components 10) are made of a magnesium alloy. A coating is applied to the surface of the main components 10.

Figure 5:
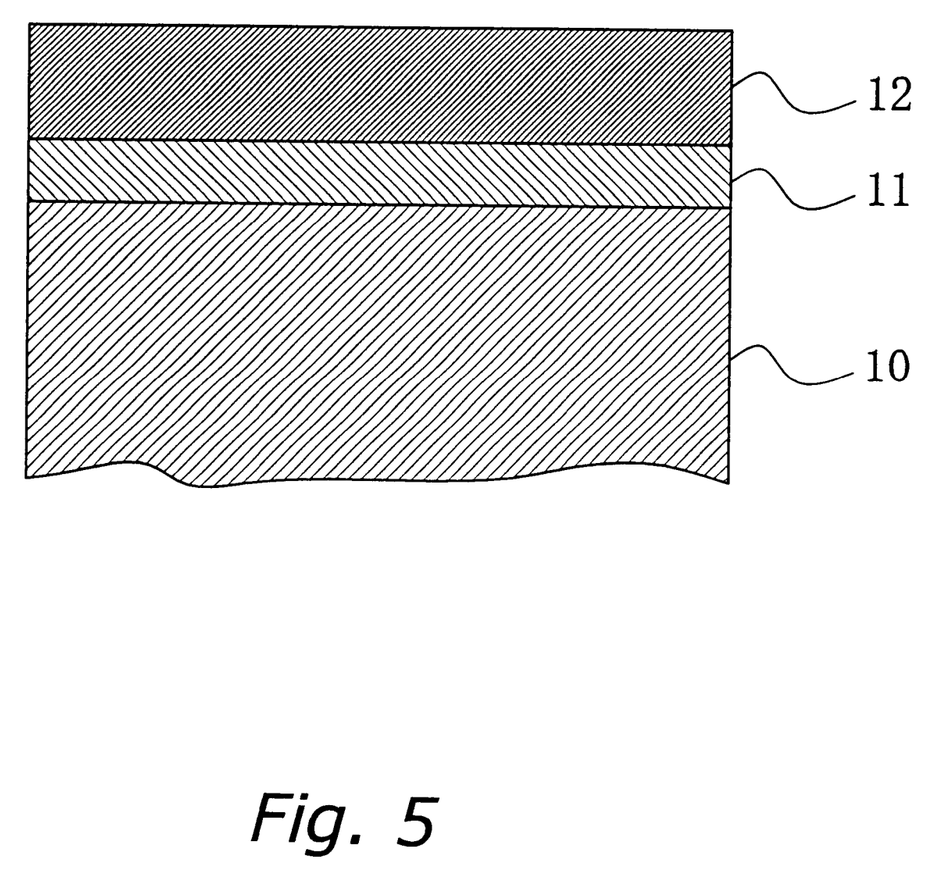
FIG. 5 is a typifying diagram of an enlarged fragmentary section of the reel body.

As shown in FIG. 5, an anodic oxide film layer 11 is formed by anodic oxidation on the surface of the main components 10 made of magnesium alloy. An electrodeposition film layer 12 is formed by electrodeposition on the surface of the anodic oxide film layer 11.

Taking the main components 10 as the anode, the anodic oxide film layer 11 is electrolytically decomposed in a solution of sulfuric acid, oxalic acid or chromic acid, and a film is formed due to oxygen generated at the anode.

The electrodeposition film layer 12 is formed by electrodeposition using a cationic electrodeposition paint, whose main component is a polyamine resin. To carry out the electrodeposition, the main components 10 which have been coated with the anodic oxide film layer 11 are immersed in a bath of the electrodeposition paint, and taking the main components 10 as the cathode and electrodes arranged in the bath of the electrodeposition paint as the anode, the main components 10 are electrolytically coated with the paint by applying a dc voltage.

To paint the main components 10 by electrodeposition, it is necessary to machine the main components 10 in a cutting process first. For example, the first side cover 6a and the second side cover 6b, which are two of the main components 10, are painted after forming the recess portion 22 (hole and female thread) and the conduit 25 in the protrusion portion 20.

In the first side cover 6a and the second side cover 6b of this dual-bearing reel, the protrusion portions 20 are provided with the conduits 25 communicated with the recess portions 22, so that when they are painted by electrodeposition, excess paint is discharged through the conduits 25 to the outside, preventing a build-up of paint in the recess portions 22.

Second Embodiment

Figure 6:
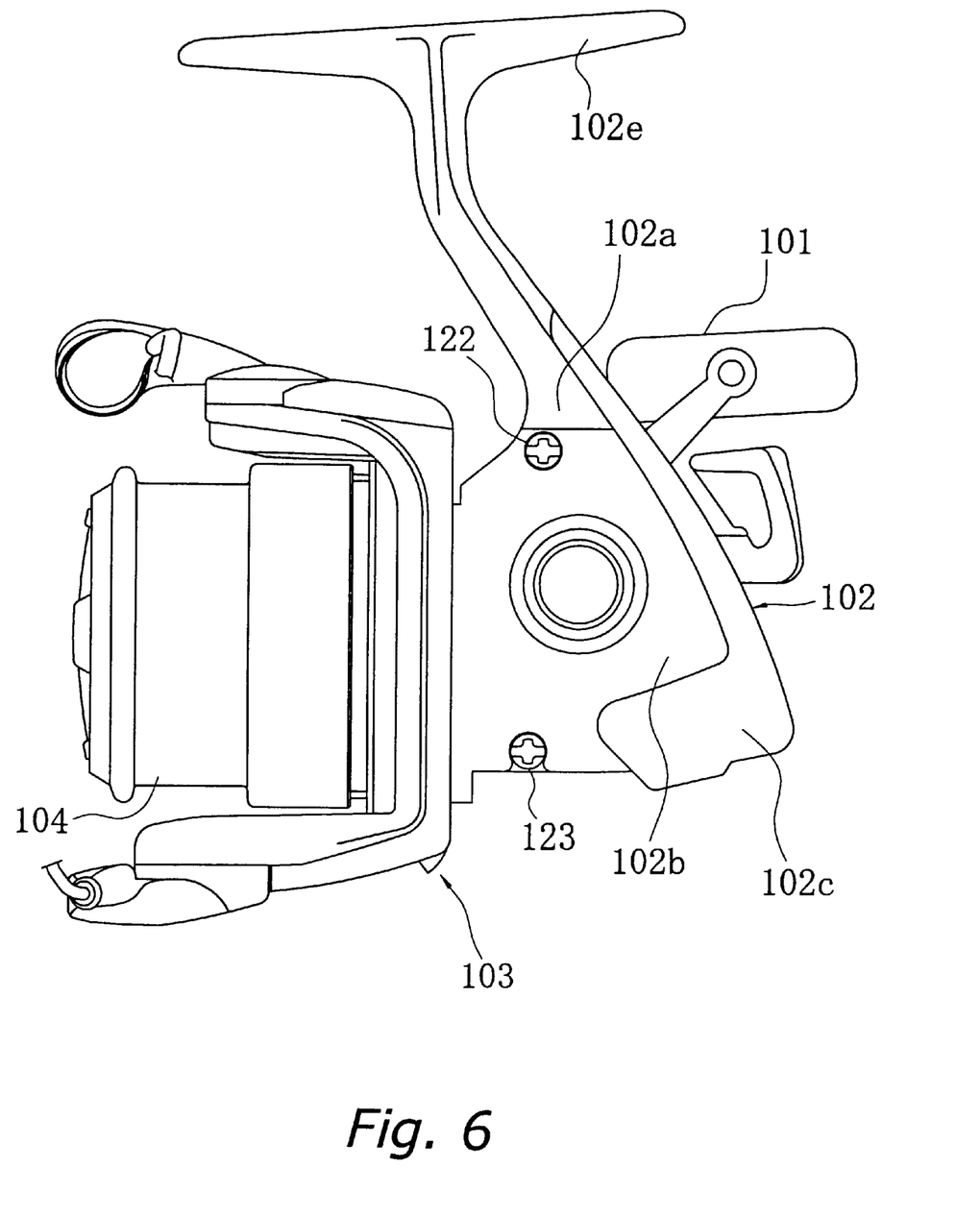
FIG. 6 is a lateral view of a spinning reel in which a second embodiment of the present invention is adapted.

As shown in FIG. 6, a spinning reel in accordance with the second embodiment of the present invention includes a handle 101, a reel body 102 rotatively supporting the handle 1, a rotor 103, and a spool 104. The rotor 103 is rotatively supported at the front of the reel body 102. The fishing line is wound around the outer peripheral surface of the spool 104, which is disposed at the front of the rotor 103 and can be shifted back and forth.

The reel body 102 includes a reel body 102a provided with a space inside, a lid member 102b and a cover member 102c mounted detachably to the reel body 102a to shut the space in the reel body 102a, and a bearing member 102d (see FIG. 10) for mounting a rotation transmission mechanism 114 described below.

Figure 7:
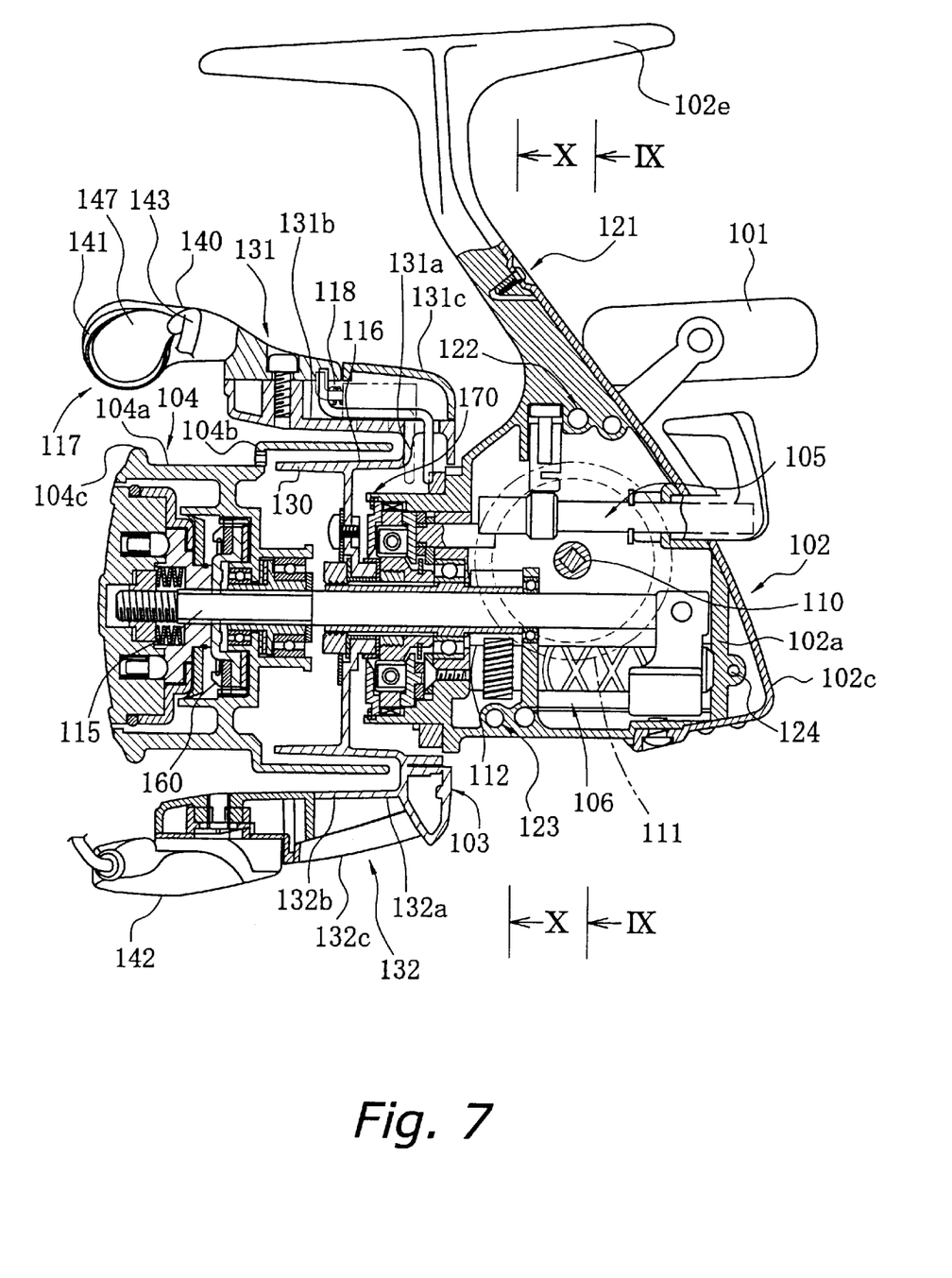
FIG. 7 is a sectional view of the FIG. 6 spinning reel.

The reel body 102a is made, for example, of a magnesium alloy, and is formed unitarily with a T-shaped rod attachment leg 102e extending horizontally at the top of the reel body 102a. As shown in FIG. 7, the space in the reel body 102a accommodates a rotor driving mechanism 105 for transmitting the rotation of the handle 101 to rotate the rotor 103, and an oscillation mechanism 106 for winding up the fishing line uniformly by shifting the spool 104 back and forth.

The lid member 102b is made, for example, of a magnesium alloy, and screwed at three locations to the left side of the reel body 102a at a second screw portion 122, a third screw portion 123, and a fourth screw portion 124, as shown in FIGS. 6 and 7.

The cover member 102c, which is for example made of a magnesium alloy, covers the rear end portion of the reel body 102a and is fastened at a first screw portion 121 to the reel body 102a at the upper rear.

As shown in FIG. 7, the rotor driving mechanism 105 includes a handle shaft 110, a face gear 111 and a pinion gear 112. The face gear 111 rotates together with the handle shaft 110, on which the handle 101 is mounted non-rotatively. The pinion gear 112 meshes with the face gear 111. The pinion gear 112 is tubular. Its front portion 112a penetrates the center of the rotor 103, and is fixed with a nut to the rotor 103. The middle and the rear end (with respect to the axial direction) of the pinion gear 112 are rotatively supported by bearings in the reel body 102.

The oscillation mechanism 106 shifts the spool 104 back and forth, shifting back and forth the spool shaft 115 to which the center of the spool 104 is coupled via a drag mechanism 160.

As shown in FIG. 7, the rotor 103 includes a rotor unit 116, a bail arm 117, and a bail flipping mechanism 118. The bail arm 117 is disposed to the front of the rotor unit 116 and is pivotable between a line-releasing position and a line-winding position. The bail flipping mechanism 118 is mounted to the rotor unit 116 and is for returning the bail arm 117 into the line-winding position.

The rotor unit 116 includes a cylindrical portion 130, a first rotor arm 131 and a second rotor arm 132. The cylindrical portion 130 is attached to the reel body 102a and can rotate freely around the spool shaft 115. The first rotor arm 131 and the second rotor arm 132 are arranged in opposition to one another on the sides of the cylindrical portion 130. The cylindrical portion 130, the first rotor arm 131 and the second rotor arm 132 can be made, for example, of an magnesium alloy, and are formed in one piece.

As shown in FIGS. 6 and 7, the first and second rotor arms 131 and 132 respectively include first and second connection portions 131a and 132a arranged at a peripheral surface at the rear of the cylindrical portion 130, first and second arm portions 131b and 132b curving out and extending frontward from the first and second connection portions 131a and 132a, and first and second cover members 131c and 132c covering the outer portions of both the two connection portions 131a and 132a and the two arm portions 131b and 132b. The first and second connection portions 131a and 132a are formed in smooth circumferential continuation of the cylindrical portion 130. First and second bail support members 140 and 142 are mounted pivotably to the outer side at the tip of the first and second arm portions 131b and 132b.

As shown in FIG. 7, a line roller 141 for guiding fishing line to the spool 104, and a fixed shaft cover 147 are fixed to the front of the first bail support member 140, with the line roller 141 being arranged between the first bail support member 140 and the fixed shaft cover 147. The line roller 141 is mounted rotatively to the front end of the first bail support member 140. The fixed shaft cover 147 is shaped like a deformed cone with a sharply tapering tip. A bail 143, made by bending a wire into U-shape, is fixed between the tip of the fixed shaft cover 147 and the second bail support member 142. The first and second bail support members 140 and 142, the line roller 141, the bail 143, and the fixed shaft cover 147 constitute the bail arm 117, which guides the fishing line to the spool 104.

The following is a detailed explanation of the configuration of the first to third screw portions 121 to 123 of the reel body 102*a*.

Figure 8:
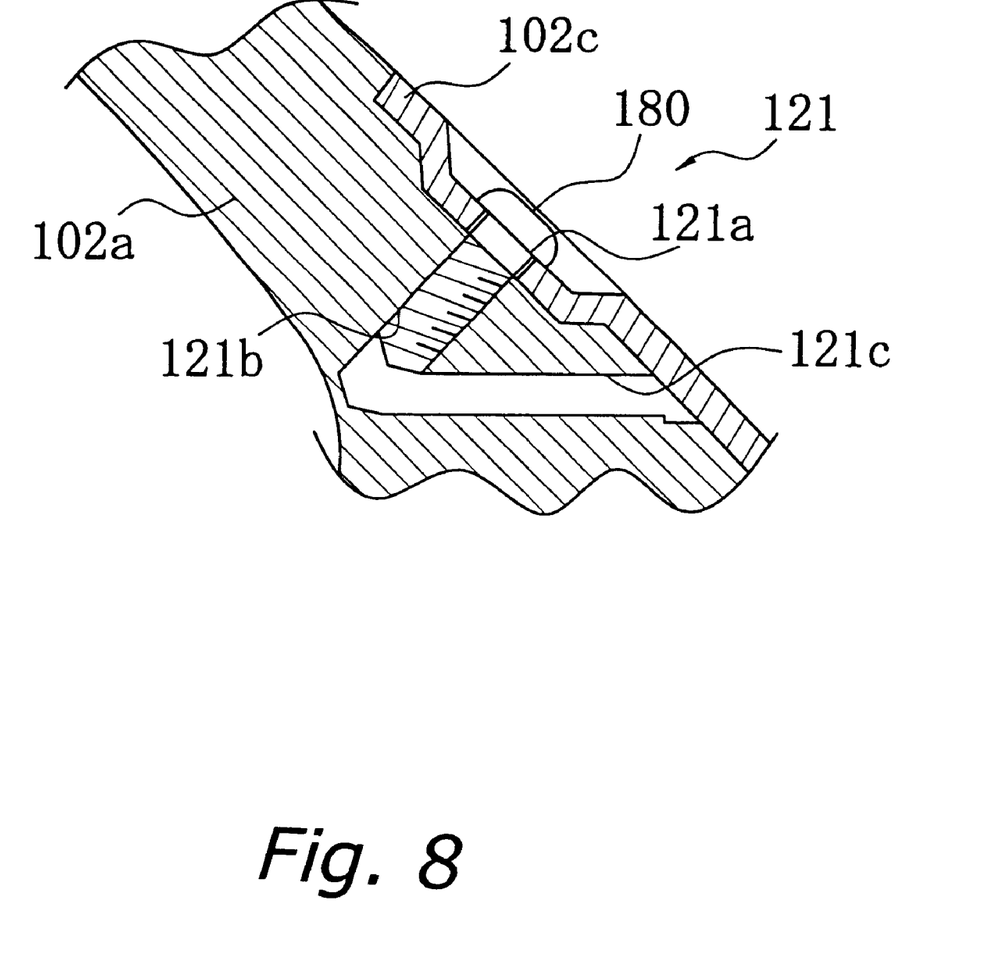
FIG. 8 is an enlarged fragmentary sectional view of the environment of a first screw portion.

As shown enlarged in FIG. 8, the first screw portion 121 includes a first recess portion 121*b* and a first conduit 121*c* communicating the first recess portion with its exterior. The first recess portion 121*b* has a first opening 121*a* and is formed at an upper rear portion of the reel body 102*a*. The inner wall of the first recess portion 121*b* is provided with a female thread, and the cover member 102*c* is fastened to the reel body 102*a* by screwing a screw 180 into the first recess portion 121*b*. The reel body 102*a* and the cover member 102*c* are provided with indentations, which accommodate the head of the screw 180 so that it does not stick out from the outer peripheral surface of the cover member 102*c*.

The cover member 102*c* is a shutoff between the first conduit 121*c* its exterior. The first conduit 121*c* is provided with an aperture on the same side as the first opening 121*a*. Furthermore, the first conduit 121*c* is formed such that the first recess portion 121*b* does not bore through the reel body 102*a*.

Figure 9:
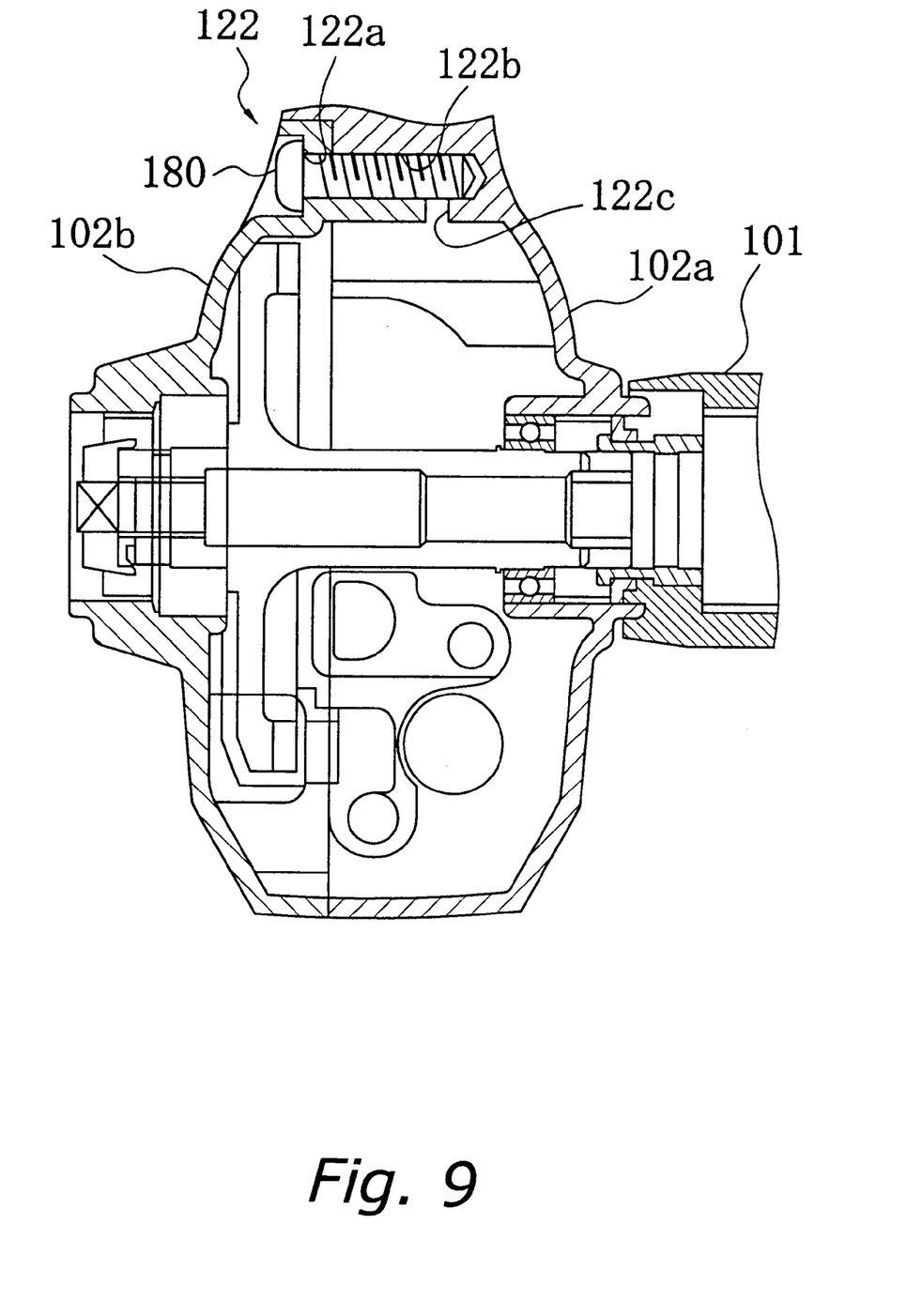
FIG. 9 is a fragmentary sectional view along IX—IX in FIG. 7.

As shown enlarged in FIG. 9, the second screw portion 122 includes a second recess portion 122*b* and a second conduit 122*c* communicating the second recess portion 122*b* with its exterior (that is, with the inside of the reel body 102). The second recess portion 122*b* has a second opening 122*a* and is formed on the upper left side of the reel body 102*a*. The inner wall of the second recess portion 122*b* is provided with a female thread, and the lid member 102*b* is fastened to the reel body 102*a* by screwing a screw 180 into the second recess portion 122*b*. The second conduit 122*c* is formed base-endward of the second recess portion 122*b*.

Figure 10:
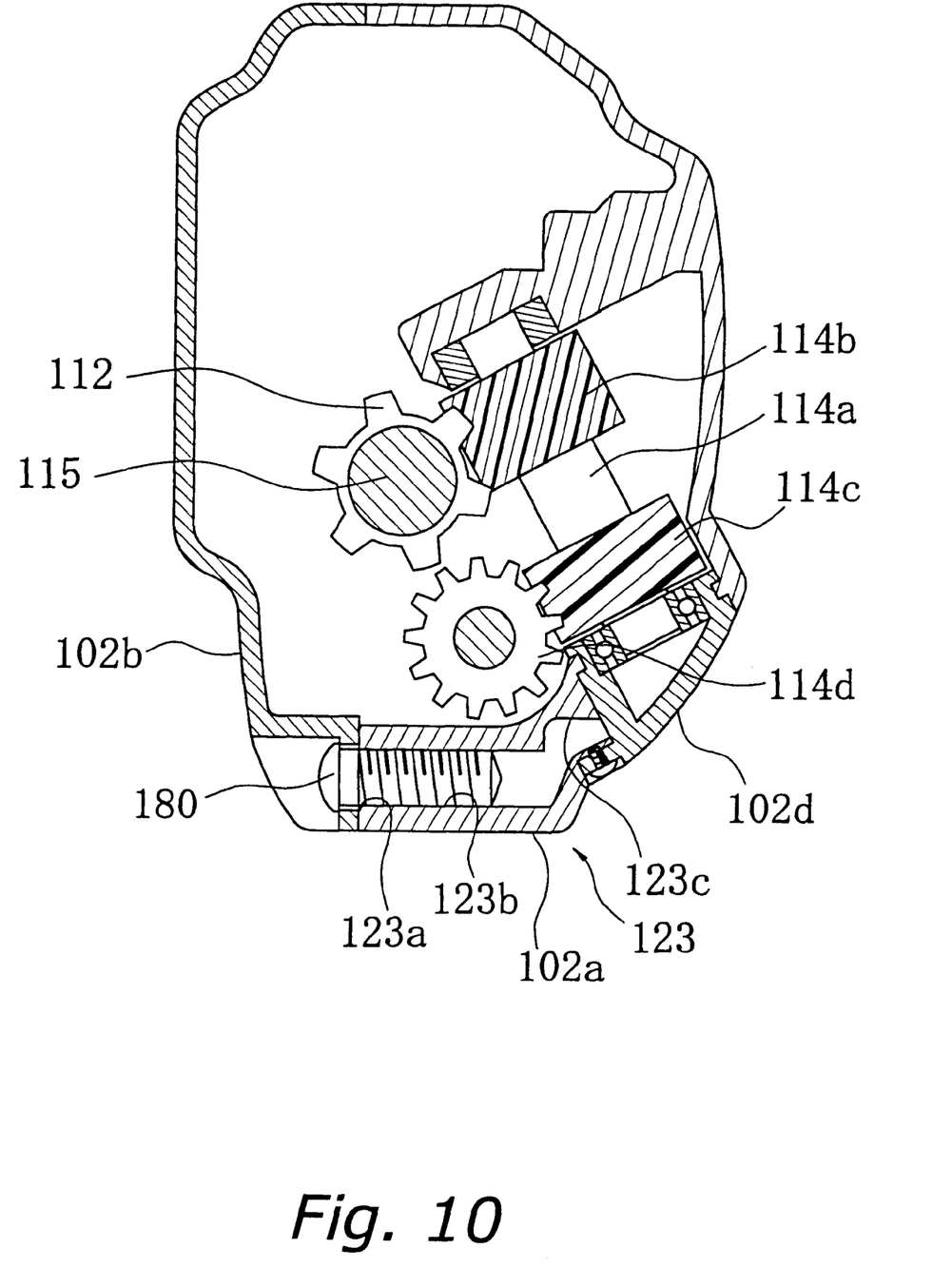
FIG. 10 is a sectional view along X—X in FIG. 7.

As shown enlarged in FIG. 10, the third screw portion 123 includes a third recess portion 123*b* and a third conduit 123*c* communicating the third recess portion 123*b* with its exterior (that is, an aperture to the side of the bearing member 102*d* on which the rotation transmission mechanism 114 is mounted). The third recess portion 123*b* has a third opening 123*a* and is formed on the lower left side of the reel body 102*a*. The rotation transmission mechanism 14 includes a pinion gear 112 mounted on the spool shaft 115, a linking shaft 114*a*, a bearing member 102*d* which rotatably supports the lower end of the linking shaft 114*a*, a bearing member which rotatably supports the upper end of the linking shaft 114*a*, and first to third gears 114*b* to 114*d*. The inner wall of the third recess portion 123*b* is provided with a female thread, and the lid member 102*b* is fastened to the reel body 102*a* by screwing a screw 180 into the third recess portion 123*b*. The third conduit 123*c* is communicated with the exterior thereof through the lower end of the third recess portion 123*b*.

All components of the reel body 102*a* are made of a magnesium alloy, and as in the first embodiment, they are painted by electrodeposition after the screw holes have been formed. The details of the electrodeposition are the same as in the first embodiment, so that their further explanation has been omitted.

In a spinning reel with this configuration, the reel body 102*a* is provided with first to third conduits 121*c* to 123*c* communicating with the first to third recess portions 121*b* to 123*b*, so that when it is painted by electrodeposition, excess paint is discharged from the first to third conduits 121*d* to 123*d* to the outside, preventing a build-up of paint in the first to third recess portions 121*c* to 123*c*.

Other Embodiments (a) The first and second embodiments have been explained taking a dual-bearing reel and a spinning reel as examples of paint-coated fishing components, but they are not thereby limited, and the present invention can be applied also to single-bearing reels or any other kind of fishing reel.

(b) In the first and second embodiments, the main components 10 are made of a magnesium alloy, but they can also be made of an aluminum alloy a titanium alloy or any other suitable metal.

Figure 11:
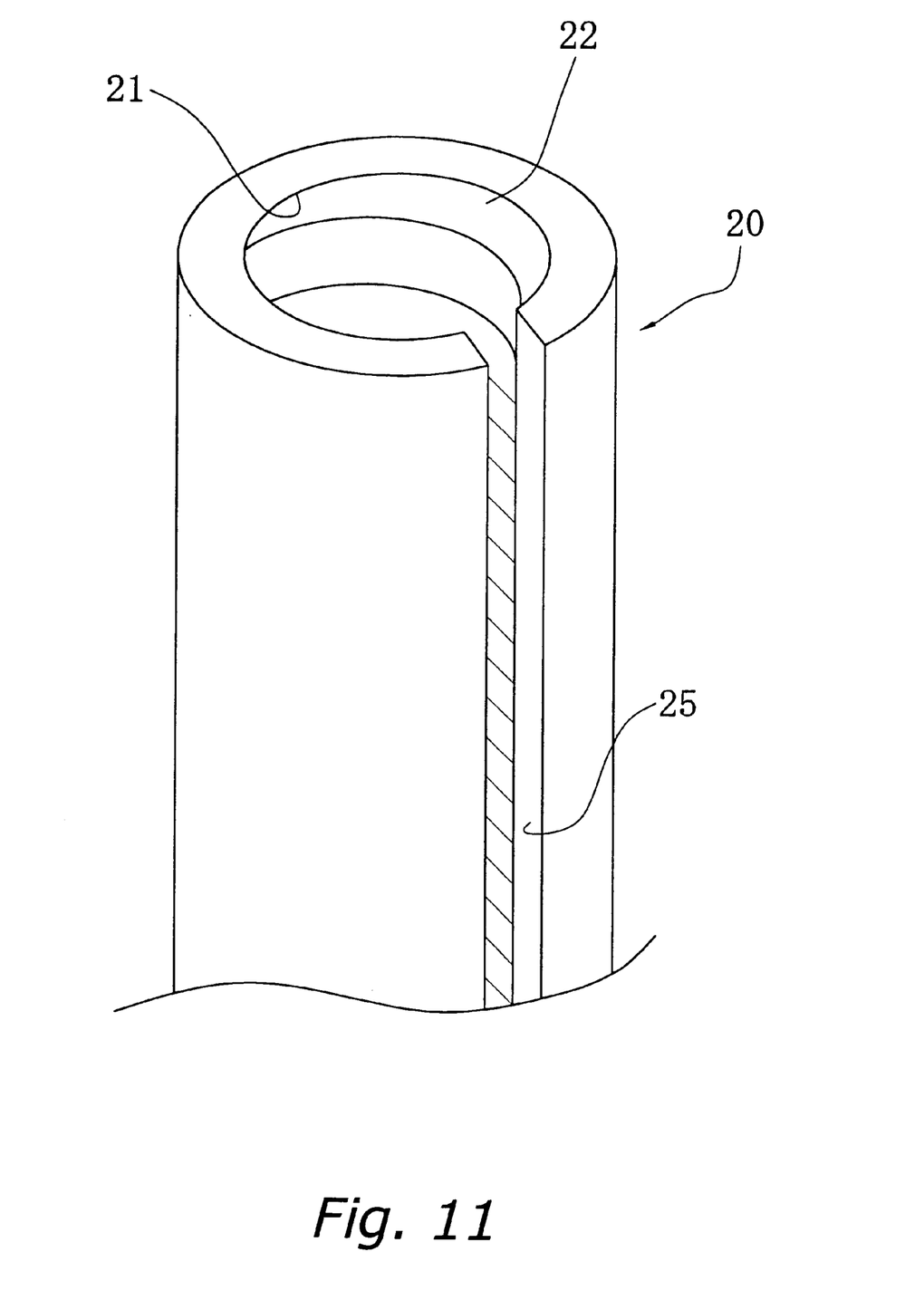
FIG. 11 is a fragmentary enlarged oblique view of a protrusion portion in another embodiment.
Figure 12:
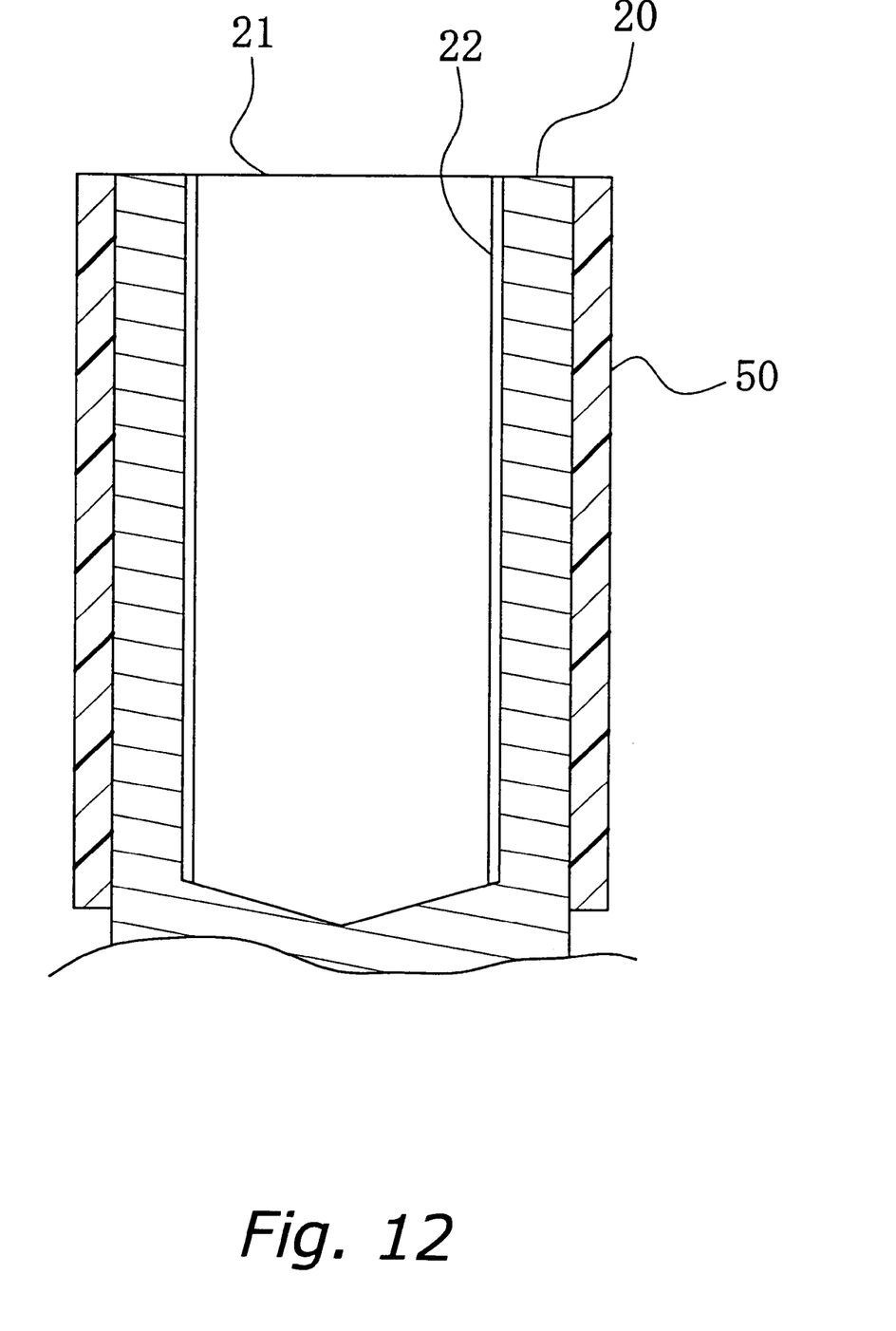
FIG. 12 is a fragmentary enlarged sectional view of a protrusion portion in another embodiment.

(c) In the first embodiment, the conduit 25 is formed as a horizontal slit in the protrusion portion 20, but it is not thereby limited, and the conduit may also be formed as a vertical slit. Moreover, as shown in FIG. 11, the conduit 25 can also be formed as a vertical slot extending from the opening 21. On the other hand, it is also possible to provide a reinforcement member 50 made of a synthetic resin can be disposed around the protrusion portion 20, as shown in FIG. 12. Here, the reinforcement member 50 functions as the cover member 102*c* of the second embodiment.

Figure 13:
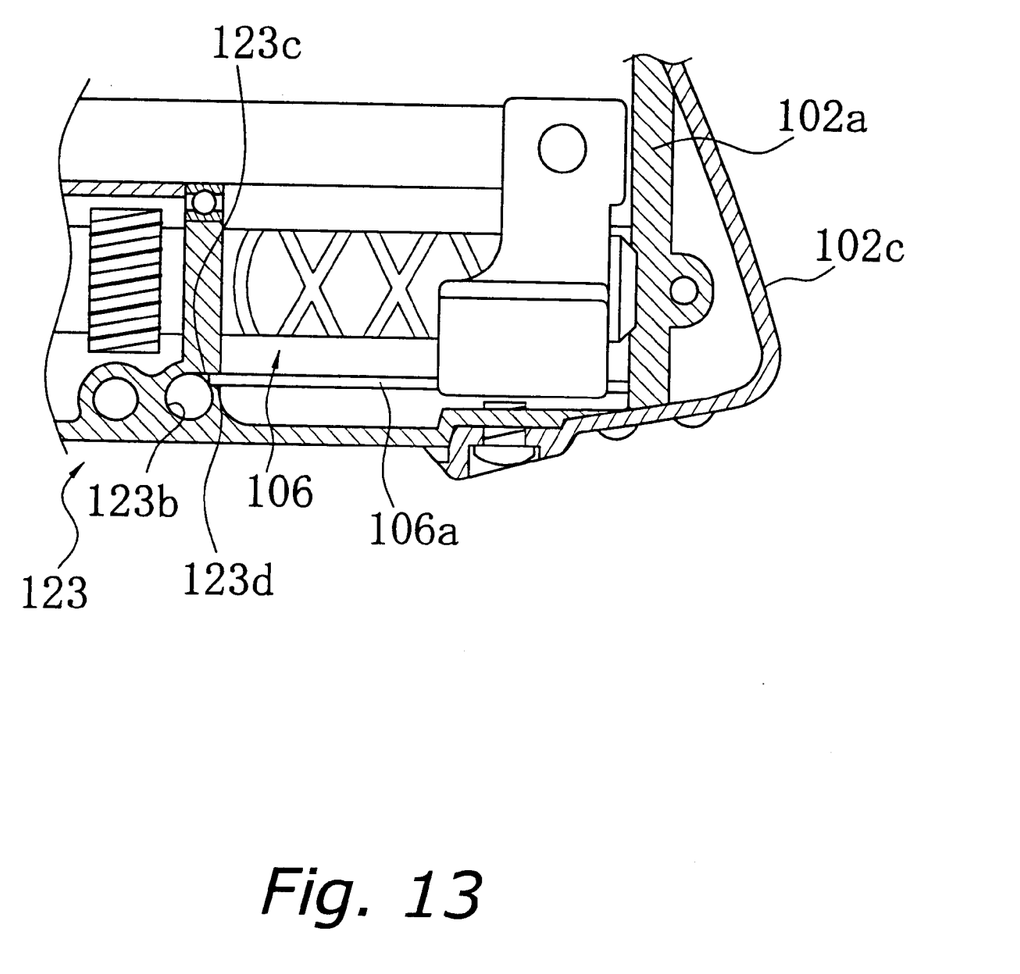
FIG. 13 is a fragmentary enlarged sectional view of the environment of a first screw portion in another embodiment.

(d) In the third screw portion 123 of the second embodiment, the third conduit 123*c* was formed such that it communicates the third recess portion 123*b* with the opening on the side of the bearing member 102*d*, to which the rotation transmission mechanism 114 is mounted. However, it is also possible to form the third conduit 123*c* by letting the screw hole 123*d* for mounting the guide shaft 106*a* of the oscillation mechanism 106 penetrate all the way to the third recess portion 123*b*, as shown in FIG. 13.

According to the present invention, in a painted fishing gear component having a main part provided with a recess portion, the main part is provided with a conduit communicating the recess portion with its exterior, so that excess paint is discharged from the conduit to the outside, preventing a build-up of paint in the recess portion.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A paint-coated fishing component for use in fishing reels, the paint-coated fishing component comprising:

a component main including a body portion, a recessed portion formed on said body portion and having an opening, and a conduit formed on said body portion and communicating said recessed portion with its exterior; and a paint layer formed by immersing said component main in paint.

2. A paint-coated fishing component as set forth in claim 1, wherein said body portion further has a protrusion portion whose tip end has said opening, and in which said conduit and said recess portion are formed.

3. A paint-coated fishing component as set forth in claim 2, wherein said conduit is a slit formed said protrusion portion.

4. A paint-coated fishing component as set forth in claim 2, wherein said conduit is formed base-endward in said protrusion portion.

5. A paint-coated fishing component as set forth in claim 2, wherein said conduit is formed extending from said opening in said protrusion portion toward its base end.

6. A paint-coated fishing component as set forth in claim 1, wherein said paint layer is an electrodeposition paint layer formed by an electrodeposition coating method.

7. A paint-coated fishing component as set forth in claim 6, further comprising an anodic oxide film layer between said component main and said electrodeposition paint layer.

8. A paint-coated fishing component as set forth in claim 1, wherein the conduit is formed by cutting work.

9. A paint-coated fishing component as set forth in claim 1, wherein said component main is made of an alloy selected from the group consisting of magnesium alloys, aluminum alloys and titanium alloys.

10. A paint-coated fishing component as set forth in claim 1, wherein the component main is a side cover attached to a fishing reel frame.

11. A paint-coated fishing component as set forth in claim 10, wherein:

said side cover is fixed by a screw to the frame;

said protrusion portion is a boss into which the screw is mounted; and said recess portion is formed with female threads into which the screw screw-mates.

12. A paint-coated fishing component as set forth in claim 1, further comprising a reinforcement member attached to said protrusion portion.

13. A paint-coated fishing component as set forth in claim 1, further comprising a cover member as a shutoff between said conduit and its exterior.

14. A paint-coated fishing component as set forth in claim 1, wherein said conduit opens the same way as said opening.

15. A paint-coated fishing component as set forth in claim 1, wherein said conduit is formed such that said recess portion does not bore through said body portion.

16. A paint-coated fishing component as set forth in claim 1, wherein said component main is the reel body portion of a fishing reel.

17. A paint-coated fishing component as set forth in claim 16, wherein a boss to which another member can be fixed by screw-fastening is formed on said reel body portion.

* * * * *